United States Patent
Liu et al.

(10) Patent No.: US 11,528,764 B2
(45) Date of Patent: Dec. 13, 2022

(54) DATA COMMUNICATION METHOD AND SYSTEM, ELECTRONIC DEVICE, CHIP AND STORAGE MEDIUM

(71) Applicant: Shenzhen Goodix Technology Co., Ltd., Shenzhen (CN)

(72) Inventors: Fei Liu, Shenzhen (CN); Dekun Chen, Shenzhen (CN); Guochao Yin, Shenzhen (CN); Jun Zhou, Shenzhen (CN); Long Xie, Shenzhen (CN); Fahai Chen, Shenzhen (CN); Qingbin Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 89 days.

(21) Appl. No.: 17/206,154

(22) Filed: Mar. 19, 2021

(65) Prior Publication Data

US 2021/0368566 A1 Nov. 25, 2021

Related U.S. Application Data

(63) Continuation of application No. 17/086,286, filed on Oct. 30, 2020, now Pat. No. 10,986,683.

(30) Foreign Application Priority Data

May 22, 2020 (CN) .......................... 202010439376.8

(51) Int. Cl.
*H04W 76/15* (2018.01)
*H04W 56/00* (2009.01)
*H04W 72/12* (2009.01)

(52) U.S. Cl.
CPC ......... *H04W 76/15* (2018.02); *H04W 56/001* (2013.01); *H04W 72/12* (2013.01)

(58) Field of Classification Search
CPC ... H04W 76/15; H04W 56/001; H04W 72/12; H04W 4/80; H04W 76/14; H04W 4/06; H04B 17/30; H04L 5/0055
See application file for complete search history.

(56) References Cited

U.S. PATENT DOCUMENTS 10,200,791 B1 2/2019 Liu et al.
10,558,427 B2 2/2020 Jo et al.
(Continued)

FOREIGN PATENT DOCUMENTS

CN 103945564 A 7/2014
CN 105161124 A 12/2015
(Continued)

OTHER PUBLICATIONS

Shenzhen Goodix Technology Co., Ltd., Notice of Allowance, U.S. Appl. No. 17/086,286, dated Dec. 30, 2020, 27 pgs.
(Continued)

*Primary Examiner* — Kyaw Z Soe
(74) *Attorney, Agent, or Firm* — USCH Law, PC

(57) ABSTRACT

Provided are a data communication method and system, an electronic device, a chip and a storage medium. The data communication method includes: establishing a wireless communication connection with a first receiving terminal, and notifying the connection information to a second receiving terminal. The connection information includes information of a communication channel for performing wireless communication between the transmitting terminal and the first receiving terminal. The connection information is used to instruct the at least one second receiving terminal to monitor communication data in the communication channel. When the at least one second receiving terminal knows after monitoring the communication data, data required to be transmitted to the first receiving terminal is transmitted to the communication channel. A first time period for the (Continued)

transmitting terminal to transmit data in the communication channel does not overlap a second time period for the at least one second receiving terminal to transmit data in the communication channel.

20 Claims, 8 Drawing Sheets

(56) References Cited

U.S. PATENT DOCUMENTS

| | | | |
|---|---|---|---|
| 2018/0176717 A1 | 6/2018 | Fu et al. | |
| 2018/0242266 A1* | 8/2018 | Xhafa | H04W 24/08 |
| 2019/0052408 A1* | 2/2019 | Yang | H04L 1/1621 |
| 2019/0253800 A1 | 8/2019 | Hsieh | |
| 2020/0260488 A1* | 8/2020 | Cherian | H04W 56/001 |

FOREIGN PATENT DOCUMENTS

| | | |
|---|---|---|
| CN | 108040308 A | 5/2018 |
| CN | 108429949 A | 8/2018 |
| CN | 108683976 A | 10/2018 |
| CN | 108702651 A | 10/2018 |
| CN | 108900981 A | 11/2018 |
| CN | 109327829 A | 2/2019 |
| CN | 109495 867 A | 3/2019 |
| CN | 109495868 A | 3/2019 |
| CN | 109905925 A | 6/2019 |
| CN | 110166951 A | 8/2019 |
| CN | 110381490 A | 10/2019 |
| CN | 110831246 A | 2/2020 |
| CN | 111163450 A | 5/2020 |
| KR | 100680734 B1 | 2/2007 |
| KR | 20110043501 A | 4/2011 |
| KR | 20140124088 A | 10/2014 |
| KR | 20150052798 A | 5/2015 |
| KR | 20170096115 A | 8/2017 |
| KR | 20180092535 A | 8/2018 |
| KR | 20180132541 A | 12/2018 |
| KR | 20190016802 A | 2/2019 |
| WO | WO 2013/096154 A1 | 6/2013 |
| WO | 2018017338 A1 | 1/2018 |
| WO | WO 2020/000425 A1 | 1/2020 |

OTHER PUBLICATIONS

Shenzhen Goodix Technology Co., Ltd., CN First Office Action, CN202011125921.2, dated Aug. 12, 2021, 23 pgs.

Shenzhen Goodix Technology Co., Ltd., KR First Office Action, KR10-2021-0007929, dated Jul. 26, 2021, 8 pgs.

Shenzhen Goodix Technology Co., Ltd., KR Notice of Allowance with English Translation, KR10-2021-0007929, dated Nov. 12, 2021, 7 pgs.

Shenzhen Goodix Technology Co., Ltd., International Search Report, PCT/CN2020/091707, dated Feb. 22, 2021, 4 pgs.

Shenzhen Goodix Technology Co., Ltd., First Office Action (CN), CN202010439376.8, dated Jul. 15, 2020, 11 pgs.

Shenzhen Goodix Technology Co., Ltd., CN Second Office Action with English Translation, CN 202011125921.2, dated Mar. 3, 2022, 21 pgs.

Shenzhen Goodix Technology Co., Ltd., Extended European Search Report, EP20205200.7, dated Apr. 22, 2021, 9 pgs.

* cited by examiner

DATA COMMUNICATION METHOD AND SYSTEM, ELECTRONIC DEVICE, CHIP AND STORAGE MEDIUM

CROSS-REFERENCE TO RELATED APPLICATION

This application is a continuation of the U.S. patent application Ser. No. 17/086, 286 filed on Oct. 30, 2020, and which claims the benefit of priority to Chinese Patent Application No. 202010439376.8 filed on May 22, 2020, the disclosure of which is incorporated by reference herein in its entirety.

TECHNICAL FIELD

The present disclosure relates to the field of communication technology, and in particular, to a data communication method and system, an electronic device, a chip and a storage medium.

BACKGROUND

Currently, when multiple wireless receiving devices perform data communication, a wireless communication connection is required to be established among the wireless receiving devices, so that data communication can be carried out over the wireless communication connection.

SUMMARY

Some embodiments of the present disclosure aim to provide a data communication method and system, an electronic device, a chip and a storage medium that can perform data communication between a first receiving terminal and a second receiving terminal without establishing a wireless communication connection between the first receiving terminal and the at least one second receiving terminal, preventing a time-consuming and complex process of establishing the wireless communication connection between the first receiving terminal and the at least one second receiving terminal, and enabling more convenient data transmission between the first receiving terminal and the at least one second receiving terminal.

An embodiment of the present disclosure provides a data communication method applied to a transmitting terminal, including: notifying connection information to at least one second receiving terminal after establishing a wireless communication connection with a first receiving terminal. Herein, the connection information includes information of a communication channel for performing wireless communication between the transmitting terminal and the first receiving terminal. The connection information is used to instruct the at least one second receiving terminal to monitor communication data in the communication channel; and to enable the at least one second receiving terminal to transmit data—required to be transmitted to the first receiving terminal—to the communication channel when the communication data is known after monitoring by the at least one second receiving terminal. A first time period for the transmitting terminal to transmit data in the communication channel does not overlap a second time period for the at least one second receiving terminal to transmit data in the communication channel.

An embodiment of the present disclosure provides a data communication method applied to a first receiving terminal, including: notifying connection information to at least one second receiving terminal after establishing a wireless communication connection with a transmitting terminal. Herein, the connection information includes information of a communication channel for performing wireless communication between the transmitting terminal and the first receiving terminal. The connection information is used to instruct the at least one second receiving terminal to monitor communication data in the communication channel; and to enable the at least one second receiving terminal to transmit data—required to be transmitted to the first receiving terminal—to the communication channel when the communication data is known after monitoring by the at least one second receiving terminal. A first time period for the transmitting terminal to transmit data in the communication channel does not overlap a second time period for the at least one second receiving terminal to transmit data in the communication channel.

An embodiment of the present disclosure further provides a data communication method applied to a second receiving terminal, including: receiving connection information, herein the connection information is notified after a wireless communication connection is established between the transmitting terminal and a first receiving terminal; the connection information includes information of a communication channel for performing wireless communication between the transmitting terminal and the first receiving terminal, and the connection information is used to instruct the at least one second receiving terminal to monitor communication data in the communication channel; monitoring the communication data in the communication channel; transmitting data required to be transmitted to the first receiving terminal to the communication channel, herein a first time period for the transmitting terminal to transmit data in the communication channel does not overlap a second time period for the at least one second receiving terminal to transmit data in the communication channel.

An embodiment of the present disclosure further provides a data communication system including: a transmitting terminal, a first receiving terminal and a second receiving terminal. The transmitting terminal or the first receiving terminal are configured to notify connection information to at least one second receiving terminal, after a wireless communication connection is established between the transmitting terminal and a first receiving terminal. The connection information includes information of a communication channel for performing wireless communication between the transmitting terminal and the first receiving terminal. The connection information is used to instruct the at least one second receiving terminal to monitor communication data in the communication channel. The second receiving terminal is configured to monitor the communication data in the communication channel, and to transmit data required to be transmitted to the first receiving terminal to the communication channel. Herein, a first time period for the transmitting terminal to transmit data in the communication channel does not overlap a second time period for the at least one second receiving terminal to transmit data in the communication channel.

An embodiment of the present disclosure further provides an electronic device including at least one processor and a memory in communication connection with the at least one processor. Herein, the memory stores an instruction executable by the at least one processor, and the instruction is executable by the at least one processor. When the electronic device is a transmitting terminal, the at least one processor may implement the above data communication method applied to the transmitting terminal. When the electronic device is a first receiving terminal, the at least one processor may implement the data communication method applied to the first receiving terminal. When the electronic device is a second receiving terminal, the at least one processor may implement the above data communication method applied to the at least one second receiving terminal.

An embodiment of the present disclosure further provides a chip including at least one processor, and a memory in communication connection with the at least one processor. Herein, the memory stores an instruction executable by the at least one processor, and the instruction is implemented by the at least one processor, so that the at least one processor may implement the above data communication method applied to the transmitting terminal, or implement the above data communication method applied to the first receiving terminal, or implement the data communication method applied to the at least one second receiving terminal.

An embodiment of the present disclosure further provides a computer readable storage medium storing a computer program. When implemented by a processor, the computer program implements the data communication method applied to the transmitting terminal, or implements the data communication method applied to the first receiving terminal, or implements the data communication method applied to the at least one second receiving terminal.

The inventor finds that at least the following problem exists in the existing technology: in the existing technology, data communication is performed based on a wireless communication connection established between each other, and a wireless communication connection requires to be established among a plurality of wireless receiving devices through a wireless communication protocol. Therefore, a process for establishing a wireless communication connection is relative time-consuming and complex, and data communication performed among a plurality of wireless receiving devices is inconvenient.

Compared with the existing technology, in the present disclosure, the transmitting terminal notifies the connection information to the at least one second receiving terminal after establishing the wireless communication connection with the first receiving terminal. The connection information includes information of a communication channel for performing wireless communication between the transmitting terminal and the first receiving terminal. The connection information is used to instruct the at least one second receiving terminal to monitor communication data in the communication channel, so that the at least one second receiving terminal may monitor the communication data in the communication channel between the transmitting terminal and the first receiving terminal after the at least one second receiving terminal receives the connection information, thereby the at least one second receiving terminal may acquire the data transmitted from the first receiving terminal by monitoring the communication channel. The second receiving terminal transmits the data required to be transmitted to the first receiving terminal to the communication channel, so that the first receiving terminal may receive the data transmitted from the at least one second receiving terminal in the communication channel. The first time period and the second time period do not overlap each other, that is, both the transmitting terminal and the at least one second receiving terminal may transmit data to the first receiving terminal through the communication channel, but the transmitting terminal and the at least one second receiving terminal transmit data in different time periods, so that the data transmitted from the transmitting terminal and the at least one second receiving terminal in the communication channel do not interfere with each other, thereby the first receiving terminal may accurately receive and identify the data transmitted from the at least one second receiving terminal. Therefore, this embodiment may perform the data communication between the first receiving terminal and the at least one second receiving terminal without establishing a wireless communication connection between the first receiving terminal and the at least one second receiving terminal, so that data communication between the first receiving terminal and the at least one second receiving terminal is more convenient.

For example, after the step of notifying the connection information to the at least one second receiving terminal, the method applied to the transmitting terminal further including: transmitting data to the first receiving terminal through the communication channel in the first time period. Herein, the connection information is used to instruct the at least one second receiving terminal to monitor data transmitted from the transmitting terminal in the communication channel, to enable the at least one second receiving terminal to transmit required to be transmitted to the first receiving terminal to the communication channel within the second time period, when the data transmitted from the transmitting terminal is known after monitoring by the at least one second receiving terminal. Herein, the data required to be transmitted to the first receiving terminal is used to indicate whether the data transmitted from the transmitting terminal and known after monitoring by the at least one second receiving terminal is correct. That is, when the transmitting terminal transmits data to the first receiving terminal through the communication channel, the at least one second receiving terminal may acquire the data from the monitored communication channel, and transmit in the communication channel the data indicating whether the data acquired by the at least one second receiving terminal is correct. The second receiving terminal may acquire the data transmitted from the transmitting terminal without establishing a wireless communication connection with the transmitting terminal, and the first receiving terminal may know whether the data acquired by the second terminal is correct without establishing a wireless communication connection with the at least one second receiving terminal.

For example, the data transmitted from the transmitting terminal is data to be synchronized, and the method applied to the transmitting terminal further includes: it is determined that the first receiving terminal and the at least one second receiving terminal complete data synchronization, if a confirmation message transmitted from the first receiving terminal is received. Herein, the confirmation message is a message transmitted from the first receiving terminal when a preset condition is met. The preset condition is that the first receiving terminal receives preset data from the at least one second receiving terminal and that the first receiving terminal determines that the data received to be synchronized is correct, the preset data being used for indicating that the data to be synchronized known after monitoring by the at least one second receiving terminal is correct. By receiving the confirmation message transmitted from the first receiving terminal, it may be determined that the first receiving terminal and the at least one second receiving terminal both have received the correct data to be transmitted, which is advantageous for performing data synchronization between the first receiving terminal and the at least one second receiving terminal without establishing a wireless connection between the first receiving terminal and the at least one second receiving terminal.

For example, the first time period and the second time period are acquired through a preset time slice division, and the preset time slice is a time slice predetermined for the first receiving terminal to receive data. The first receiving terminal may receive the data transmitted from the transmitting terminal and the data transmitted from the at least one second receiving terminal at the same time slice, so that the first receiving terminal may quickly acquire the data transmitted from the transmitting terminal and the data transmitted from the at least one second receiving terminal.

For example, the wireless communication connection established between the transmitting terminal and the first receiving terminal is a wireless communication connection established based on a preset proprietary protocol. A duration of the preset time slice is determined according to the number of terminals in the at least one second receiving terminal. The preset time slice is a time slice predetermined for the first receiving terminal to receive data. On the basis of the proprietary protocol, the duration of the preset time slice may be customized in advance, so that the preset time slice may have enough duration of time to allow a plurality of second receiving terminals to transmit data in the communication channel, which is advantageous for meeting a requirement of performing data synchronization among the plurality of receiving terminals according to the actual requirements.

For example, there are N second receiving terminals, N being a natural number greater than 1. Herein, the connection information is used to instruct the N second receiving terminals to monitor communication data in the communication channel, and transmit the data required to be transmitted to the first receiving terminal to the communication channel in a preset order. That is, when there are more than one second receiving terminals, the at least one second receiving terminals transmit data in the communication channel in a preset order, so as to perform data communication with the first receiving terminal, which is advantageous for meeting the requirement of performing data communication between a plurality of receiving terminals according to actual requirements.

For example, the wireless communication connection is a Bluetooth connection, and the step of notifying the connection information to the at least one second receiving terminal includes: notifying the connection information to the at least one second receiving terminal through broadcasting. A Bluetooth connection consumes less power, and by notifying the connection information to the at least one second receiving terminal through broadcasting, the at least one second receiving terminal may receive the connection information without establishing a wireless communication connection with the transmitting terminal.

BRIEF DESCRIPTION OF THE DRAWINGS

One or more embodiments are exemplified by corresponding drawings, and these exemplified descriptions do not constitute a limitation to the embodiments.

DETAILED DESCRIPTION

In order to clarify the objective, the technical solutions and advantages of the present disclosure, some embodiments of the present disclosure are described in further detail in the following with reference to the drawings and examples. It shall be appreciated that the embodiments described herein are only for explaining rather than defining the present disclosure. The following embodiments are described separately to facilitate description rather than to define implementation of the present disclosure in any manner. The embodiments may be combined and referred to by each other as long as there is no contradiction.

A first embodiment of the present disclosure relates to a data communication method applied to a transmitting terminal. In this embodiment, data communication between a first receiving terminal and a second receiving terminal may be performed without establishing a wireless connection between the first receiving terminal and the at least one second receiving terminal. Implementation details of this embodiment are described in the following. The following content is to facilitate understanding the implementation details, but is not indispensable for implementing this solution. An application scenario of this embodiment may be appreciated as the transmitting terminal performing data communication with a plurality of receiving terminals and data communication being performed among the plurality of receiving terminals. In implementation, the transmitting terminal and the receiving terminal may be a chip or an electronic device, to which this embodiment is not limited.

In one example, the transmitting terminal may be an audio source, for example, a terminal such as a mobile phone or a tablet computer capable of transmitting audio, and the receiving terminal may be a speaker which may be understood as an electronic device with an acoustic transducer, for example, an earphone or a sound box. There may be more than one receiving terminals, for example, two wireless earphones worn by a left ear and a right ear, and/or a plurality of sound boxes placed at different places. In another example, the transmitting terminal may be a mechanical arm controller, the receiving terminal may be a mechanical arm. There may be a plurality of mechanical arms that may cooperate to complete a task. It shall be noted that the above two examples are only possible implementations for a transmitting terminal and a receiving terminal to facilitate understanding. In implementation, the transmitting terminal and the receiving terminal are not limited to the examples.

Figure 1:
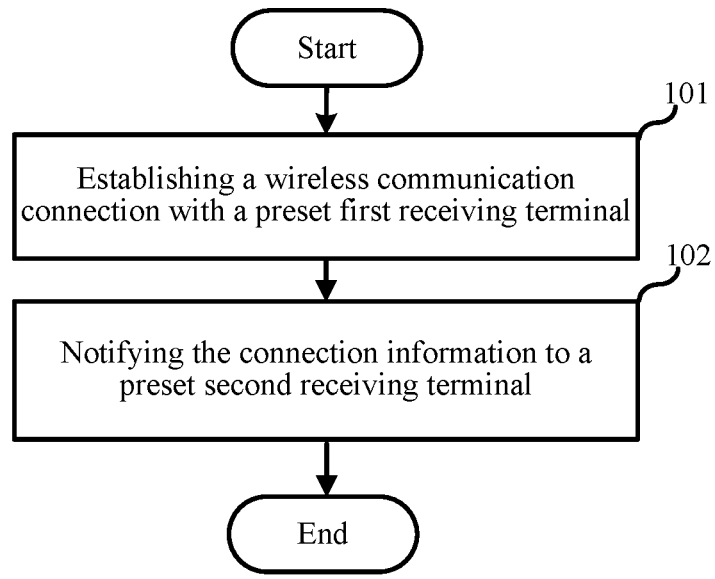
FIG. 1 is a flowchart of a data communication method in a first embodiment of the present disclosure.

A particular process of the data communication method in this embodiment may be as shown in FIG. 1, including:

Step 101: establishing a wireless communication connection with a first receiving terminal.

Herein, the first receiving terminal may be one receiving terminal preselected from at least two receiving terminals.

Specifically, the wireless communication connection may be established between the transmitting terminal and the first receiving terminal through a preset communication protocol. The preset communication protocol may either be a standard wireless protocol or a proprietary protocol, or a combination of the standard wireless protocol and the proprietary protocol. Herein, the proprietary protocol is a protocol customized according to an actual need, for example, a protocol developed by a manufacturer. The standard wireless protocol is a protocol defined and accepted by a standardization organization.

In one example, the wireless communication connection established between the transmitting terminal and the first receiving terminal may be a Bluetooth connection, wireless-fidelity (WIFI) connection and the like.

Step 102: notifying the connection information to at least one second receiving terminal.

Herein, the at least one second receiving terminal may be a remaining receiving terminal after preselecting one of at least two receiving terminals as the first receiving terminal. Herein, there may be one or more remaining receiving terminals. That is, in implementation, there may be one or more second receiving terminals. If there are N second receiving terminals, N being a natural number greater than 1, in this step, the transmitting terminal may notify the connection information to the N second receiving terminals. However, in this embodiment, the number of second receiving terminals is not specifically defined, but may be decided according to a particular requirement.

In one example, the transmitting terminal may notify the connection information to the at least one second receiving terminal through broadcasting. That is, after the transmitting terminal establishes a wireless communication connection with the first receiving terminal, the transmitting terminal notifies the connection information of the connection established between the transmitting terminal and the first receiving terminal to the at least one second receiving terminal through broadcasting. The notification through broadcasting enables the transmitting terminal to notify the connection information to the at least one second receiving terminal without establishing a wireless communication connection with the at least one second receiving terminal. Herein, the broadcasting may be directional or non-directional, which is not defined in this embodiment, but any manner for notifying the connection information to the at least one second receiving terminal is within the protection scope of this embodiment. It shall be noted that in this embodiment, that the transmitting terminal notifies the connection information to the at least one second receiving terminal is taken as an example. In implementation, the first receiving terminal may notify the connection information to the at least one second receiving terminal, however, the present disclosure is not limited thereto.

The connection information notified by the transmitting terminal to the at least one second receiving terminal includes: information of a communication channel for performing wireless communication between the transmitting terminal and the first receiving terminal. Specifically, the information of the communication channel for performing wireless communication between the transmitting terminal and the first receiving terminal may include a communication frequency for performing the wireless communication between the transmitting terminal and the first receiving terminal. In implementation, data may be divided into a plurality of data packets for transmission. Each of the data packets may be transmitted at different frequencies. Therefore, communication between the transmitting terminal and the first receiving terminal may be performed at a series of preset communication frequencies. For example, the series of communication frequencies may be a combination of 2502 MHz, 2504 MHz, 2506 MHz and 2508 MHz. Herein, one communication frequency may indicate one communication channel. That is, the communication between the transmitting terminal and the first receiving terminal may be performed at a series of preset communication channels, however, this embodiment is not limited thereto.

The connection information notified to the at least one second receiving terminal from the transmitting terminal is used to instruct the at least one second receiving terminal to monitor communication data in the communication channel; when the at least one second receiving terminal knows after monitoring the communication data, data required to be transmitted to the first receiving terminal is transmitted to the communication channel. That is, the connection information may further be used to instruct the at least one second receiving terminal to transmit the data required to be transmitted to the first receiving terminal to the communication channel. It may be appreciated that the communication data monitored in the communication channel by the at least one second receiving terminal may include: data transmitted from the transmitting terminal to the first receiving terminal through the communication channel; and may include: data transmitted from the first receiving terminal to the transmitting terminal through the channel. In implementation, the transmitting terminal and the first receiving terminal may transmit data in the same communication channel without interfering each other, or may transmit data in different communication channels. However, this embodiment is not limited thereto.

In one example, the transmitting terminal and the at least one second receiving terminal may pre-agree that: if the at least one second receiving terminal receives the connection information transmitted from the transmitting terminal, the at least one second receiving terminal acquires the information of the communication channel for performing wireless communication between the transmitting terminal and the first receiving terminal according to the connection information, thereby determining the communication channel for wireless communication between the transmitting terminal and the first receiving terminal, monitoring the communication data in the communication channel, and transmitting the data required to be transmitted to the first receiving terminal to the communication channel.

In another example, the connection information transmitted to the at least one second receiving terminal from the transmitting terminal may carry a preset identifier. If the at least one second receiving terminal identifies the preset identifier from the received connection information, the at least one second receiving terminal acquires the information of the communication channel for performing wireless communication between the transmitting terminal and the first receiving terminal according to the connection information, thereby determining the communication channel for performing wireless communication between the transmitting terminal and the first receiving terminal, monitoring the communication data in the communication channel, and transmitting the data required to be transmitted to the first receiving terminal to the communication channel. Herein, the preset identifier may be set according to an actual requirement, however, this embodiment is not limited thereto.

In implementation, the connection information may further be used to instruct the at least one second receiving terminal to monitor data transmitted from the transmitting terminal in the communication channel. When the at least one second receiving terminal knows after monitoring the data transmitted from the transmitting terminal, the data required to be transmitted to the first receiving terminal is transmitted to the communication channel within the second time period. Herein, the data required to be transmitted to the first receiving terminal is used to indicate whether the data transmitted from the transmitting terminal and known after monitoring by the at least one second receiving terminal is correct. The data transmitted from the transmitting terminal and known after monitoring by the at least one second receiving terminal may be understood as data transmitted from the transmitting terminal and acquired by the at least one second receiving terminal. For example, the at least one second receiving terminal may determine whether the acquired data transmitted from the transmitting terminal is correct according to a preset verification mechanism. If the data is correct, the data required to be transmitted to the first receiving terminal may be acknowledgement (ACK), but if the data is incorrect, the data required to be transmitted to the first receiving terminal may be negative acknowledgement (NACK).

In one example, if there are N second receiving terminals, N being a natural number greater than 1, all the N second receiving terminals may receive the connection information notified by the transmitting terminal. The connection information is used to instruct the N second receiving terminals to monitor communication data in the communication channel, and transmit the data required to be transmitted to the first receiving terminal to the communication channel in a preset order. Herein, the preset order may be set according to an actual requirement, which is not defined in this embodiment. In implementation, time periods for the N second receiving terminal to transmit data in the communication channel may vary and may not overlap. That is, the data transmitted from the N second receiving terminals in the communication channel do not interfere with each other, thereby the first receiving terminal may correctly receive the data transmitted from the N second receiving terminals in the communication channel.

In one example, the communication channel for performing wireless communication between the transmitting terminal and the first receiving terminal includes: a first communication channel and a second communication channel. Herein, the first communication channel is a communication channel for the transmitting terminal to transmit data to the first receiving terminal, and the second communication channel is a communication channel for the first receiving terminal to transmit data to the transmitting terminal. In implementation, there may be a plurality of first communication channels, for example, the transmitting terminal may transmit data to the first receiving terminal based on a series of frequencies. There may further be a plurality of second communication channels, for example, the first receiving terminal may transmit data to the transmitting terminal based on a series of frequencies. That is, the transmitting terminal and the first receiving terminal transmit data in different communication channels and the first communication channel is distinguished from the second communication channel. That is, for the transmitting terminal and the first receiving terminal, transmitting and receiving data are in different communication channels, which is advantageous for improving correctness of transmitting and receiving data between the transmitting terminal and the first receiving terminal.

In one example, the information of the communication channel for performing wireless communication between the transmitting terminal and the first receiving terminal may include: a communication frequency of the first communication channel and a communication frequency of the second communication channel. In implementation, the transmitting terminal and/or the first receiving terminal may notify the communication frequency of the first communication channel and the communication frequency of the second communication channel to the at least one second receiving terminal. For example, the transmitting terminal notifies the communication frequency of the first communication channel and the communication frequency of the second communication channel to the at least one second receiving terminal; or the first receiving terminal notifies the communication frequency of the first communication channel and the communication frequency of the second communication channel to the at least one second receiving terminal; or the transmitting terminal notifies the communication frequency of the first communication channel to the at least one second receiving terminal, and the first receiving terminal notifies the communication frequency of the second communication channel to the at least one second receiving terminal. This is not specifically defined in this embodiment.

In one example, the connection information includes the information of the communication channel required to be monitored by the at least one second receiving terminal in the communication channel for the wireless communication between the transmitting terminal and the first receiving terminal. For example, supposing the at least one second receiving terminal requires to monitor communication data in the first communication channel, the connection information may be information of the first communication channel, for example, a communication frequency of the first communication channel. Supposing the at least one second receiving terminal requires to transmit data in the second communication channel, the connection information may be information of the second communication channel, for example, a communication frequency of the second communication channel. That is, content included in the connection information may be set according to actual requirements to meet requirements of different scenarios.

In one example, if the communication channel for wireless communication between the transmitting terminal and the first receiving terminal, i.e., the connection information, changes, the changed connection information will be notified to the at least one second receiving terminal. For example, when a wireless communication connection is reestablished between the transmitting terminal and the first receiving terminal, the connection information may change, then the transmitting terminal notifies the changed connection information to the at least one second receiving terminal. The second receiving terminal determines the communication channel for performing wireless communication currently between the transmitting terminal and the first receiving terminal according to the changed connection information.

In implementation, the at least one second receiving terminal may perform storing after receiving the connection information. Subsequently, the transmitting terminal may notify the at least one second receiving terminal through broadcasting before each time required for transmitting data, so as to instruct the at least one second receiving terminal to monitor the communication channel for performing wireless communication between the transmitting terminal and the first receiving terminal, which is advantageous for reducing power consumption of the at least one second receiving terminal.

Figure 2:
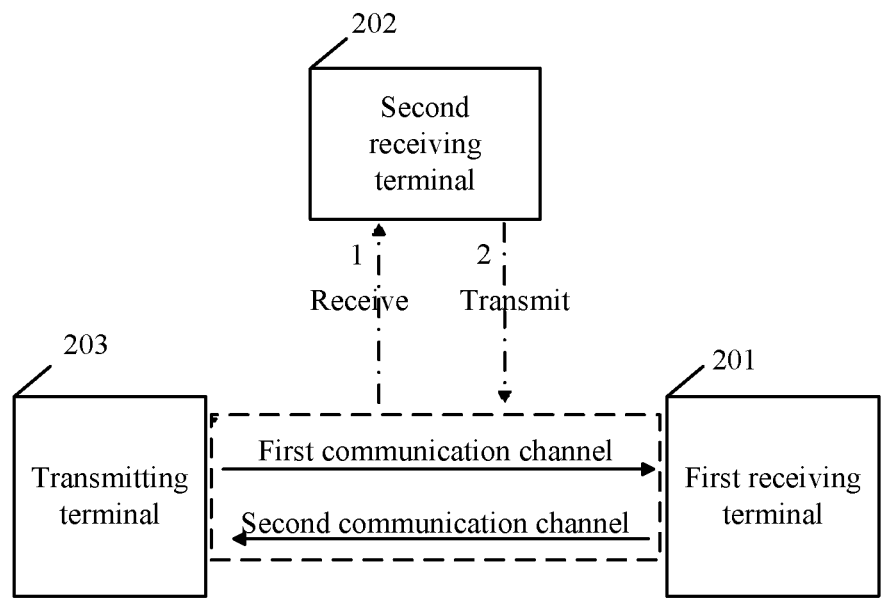
FIG. 2 is a schematic diagram showing communication among a transmitting terminal, a second receiving terminal and a first receiving terminal in the first embodiment of the present disclosure.

To facilitate understanding, referring to FIG. 2, a transmitting terminal 203 transmits data to a first receiving terminal 201 through a first communication channel. The first receiving terminal 201 transmits data to the transmitting terminal 203 through a second communication channel. A second receiving terminal 202 may monitor communication data in the first communication channel and the second communication channel, and when data requires to be transmitted, transmit data required to be transmitted to the first receiving terminal 201 to the first communication channel and transmit data required to be transmitted to the transmitting terminal 203 to the second communication channel. The first receiving terminal 201 may receive data transmitted in the first communication channel from the at least one second receiving terminal 202 through the first communication channel, and the transmitting terminal 203 may receive data transmitted in the second communication channel from the at least one second receiving terminal 202 through the second communication channel. Dotted arrow 1 in FIG. 2 indicates that the at least one second receiving terminal 202 may receive data transmitted from the transmitting terminal 203 in the first communication channel without establishing a connection with the transmitting terminal 203. The dotted arrow 1 in FIG. 2 may further indicate that the at least one second receiving terminal 202 may receive data transmitted from the first receiving terminal 201 in the second communication channel without establishing a connection with the first receiving terminal 201. Dotted arrow 2 in FIG. 2 indicates that the at least one second receiving terminal 202 may transmit data to the first receiving terminal 201 through the first communication channel without establishing a connection with the first receiving terminal 201. The dotted arrow 2 in FIG. 2 may further indicate that the at least one second receiving terminal 202 may transmit data to the transmitting terminal 203 through the second communication channel without establishing a connection with the transmitting terminal 203.

Further, a first time period for the transmitting terminal to transmit data in the communication channel does not overlap a second time period for the at least one second receiving terminal to transmit data in the communication channel. In this way, the data transmitted in the communication channel from the transmitting terminal and the data transmitted in the communication channel from the at least one second receiving terminal do not interfere with each other.

In one example, the first time period and the second time period may be acquired through a preset time slice division, and the preset time slice is a time slice predetermined for the first receiving terminal to receive data. The preset time slice may be determined according to a communication protocol that the transmitting terminal and the first receiving terminal are based on when establishing the wireless communication connection. Within the preset time slice, the first receiving terminal may continuously receive the communication data in the communication channel between the transmitting terminal and the first receiving terminal.

For a wireless communication connection established based on a standard wireless protocol, the standard wireless protocol usually specifies a duration of a preset time slice, which can also be called a width. For example, for a wireless communication connection established based on a standard Bluetooth wireless protocol, it is usually specified that a receiver and a transmitter—between which the wireless communication connection is established—transmit and receive data in a fixed time slice. In this embodiment, the receiver is the first receiving terminal, the transmitter is the transmitting terminal, and the preset time slice is the fixed time slice for the receiver to receive data as specified by the standard Bluetooth wireless protocol. The transmitting terminal may transmit data in the communication channel in a predetermined time period (the first time period) in a preset time slice, and the at least one second receiving terminal may monitor and receive data transmitted from the transmitting terminal in the communication channel. A spare time period (the second time period) in the preset time slice is reserved so that the at least one second receiving terminal may transmit data in the communication channel within the reserved spare time period. Therefore, the first receiving terminal may receive both the data transmitted from the transmitting terminal and the data transmitted from the at least one second receiving terminal in the communication channel.

For a wireless communication connection established based on a proprietary protocol, the duration of the preset time slice may be customized according to actual requirements. In implementation, the duration of the preset time slice may be determined according to the number of second receiving terminals. For example, if there are a large number of second receiving terminals, the duration of the preset time slice may be set long; and if there are a small number of second receiving terminals, the duration of the preset time slice may be set short. On the basis of the proprietary protocol, the duration of the preset time slice may be customized in advance, so that the preset time slice may have enough duration of time. The larger the number of second receiving terminals, the longer the second time period acquired through the preset time slice division, to allow a plurality of second receiving terminals to transmit data in the communication channel, thereby providing the plurality of second receiving terminals with sufficient time for transmitting data in the communication channel, which is advantageous for meeting a requirement of performing data synchronization among the plurality of receiving terminals according to the actual requirements.

In implementation, the data transmitted from the transmitting terminal in the communication channel and the data transmitted from the at least one second receiving terminal in the communication channel may be set according to the actual requirements and are not defined in this embodiment. To facilitate understanding, an example is provided in the following to describe the data transmitted from the transmitting terminal and the at least one second receiving terminal in the communication channel.

In one example, with reference to FIG. 2, data transmitted from the transmitting terminal 203 in the first communication channel may be feedback information of an operation state or an operation parameter. After the at least one second receiving terminal 202 knows after monitoring the feedback information in the first communication channel, the at least one second receiving terminal 202 transmits response information in the first communication channel. The response information may include an operation state or an operation parameter of the at least one second receiving terminal 202. That is, data transmitted from the at least one second receiving terminal 202 in the first communication channel may be the above response information. The first receiving terminal 201 may receive the feedback information transmitted from the transmitting terminal 203 and the response information transmitted from the at least one second receiving terminal 202 through the first communication channel, so as to know the operation state or operation parameter of the at least one second receiving terminal 202. Besides, the first receiving terminal 201 may transmit the operation state or operation parameter of the first receiving terminal 201 in the second communication channel after receiving the above feedback information, so that the at least one second receiving terminal 202 may know the operation state or operation parameter of the first receiving terminal 201 in the second communication channel. That is, the first receiving terminal 201 and the at least one second receiving terminal 202 may perform data communication without establishing a wireless communication connection.

To facilitate understanding, that the receiving terminal is a speaker is taken as an example. Herein, the first receiving terminal and the at least one second receiving terminal are a first speaker and a second speaker respectively, and the transmitting terminal is an audio source. After a wireless communication connection is established between the first speaker and the audio source, the connection information is notified to the second speaker by the audio source or the first speaker, and the second speaker starts to monitor the communication channel between the first speaker and the audio source. After the second speaker knows after monitoring the feedback information of the operation parameter transmitted from the audio source in the communication channel, an operation parameter of the second speaker is transmitted to the communication channel. The first speaker may receive the operation parameter of the second speaker and the feedback information transmitted from the above audio source through the communication channel; and the operation parameter of the first speaker is transmitted to the communication channel, so that the second speaker may monitor and then know after monitoring the operation parameter of the first speaker. Accordingly, the first speaker and the second speaker may know each other's operation parameters without establishing a communication connection. Herein, the operation parameters may be set according to actual requirements, and may be, for example, remaining power, operation time, operation manner and so on.

It shall be noted that the above examples in this embodiment are to facilitate understanding rather than to define the technical solutions of the present disclosure.

Compared with the existing technology, the connection information is notified to the at least one second receiving terminal after the wireless communication connection is established between the transmitting terminal and the first receiving terminal. The connection information includes information of a communication channel for performing wireless communication between the transmitting terminal and the first receiving terminal; the connection information is used to instruct the at least one second receiving terminal to monitor communication data in the communication channel, so that the at least one second receiving terminal may monitor the communication data in the communication channel between the transmitting terminal and the first receiving terminal after the at least one second receiving terminal receives the connection information, thereby the at least one second receiving terminal may acquire the data transmitted from the first receiving terminal by monitoring the communication channel. The second receiving terminal transmits the data required to be transmitted to the first receiving terminal to the communication channel, so that the first receiving terminal may receive the data transmitted from the at least one second receiving terminal in the communication channel. The first time period and the second time period do not overlap each other, that is, both the transmitting terminal and the at least one second receiving terminal may transmit data to the first receiving terminal through the communication channel, but the transmitting terminal and the at least one second receiving terminal transmit data in different time periods, so that the data transmitted from the transmitting terminal and the data transmitted from the at least one second receiving terminal in the communication channel do not interfere with each other, thereby the first receiving terminal may accurately receive and identify the data transmitted from the at least one second receiving terminal. Therefore, this embodiment may complete the data communication between the first receiving terminal and the at least one second receiving terminal without establishing a wireless communication connection between the first receiving terminal and the at least one second receiving terminal, so that data communication between the first receiving terminal and the at least one second receiving terminal is more convenient.

A second embodiment of the present disclosure relates to a data communication method. In this embodiment, data synchronization between the first receiving terminal and the at least one second receiving terminal, for example, data synchronization among a plurality of speakers and data synchronization among a plurality of mechanical arms, may be completed without establishing a wireless connection between the first receiving terminal and the at least one second receiving terminal. Implementation details of this embodiment are described in the following. The following content is to facilitate understanding the implementation details, but is not indispensable for implementing this solution.

Figure 3:
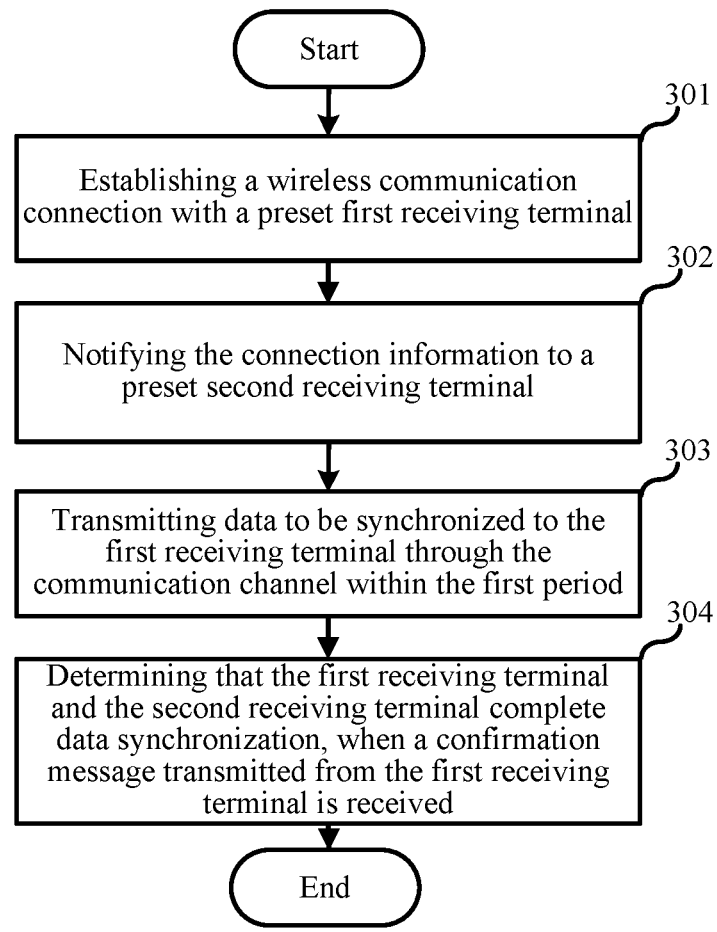
FIG. 3 is a flowchart of a data communication method in a second embodiment of the present disclosure.

A flowchart of the data communication method in this embodiment is shown in FIG. 3, including:

Step 301: establishing a wireless communication connection with a first receiving terminal.

Step 302: notifying a connection information to at least one second receiving terminal.

Herein, Steps 301 to 302 are respectively the same with Steps 101 to 102, and thus are not repeated here.

Step 303: transmitting data to be synchronized to the first receiving terminal through the communication channel within the first time period.

Herein, the data to be synchronized is the data transmitted from the transmitting terminal in the communication channel. In one example, the transmitting terminal is an audio source, the first receiving terminal is a first speaker, and the data to be synchronized is an audio data packet. In another example, the transmitting terminal is a mechanical arm controller, the first receiving terminal is a first mechanical arm, and the data to be synchronized may be control information for the mechanical arm.

The connection information notified from the transmitting terminal to the at least one second receiving terminal is used to instruct the at least one second receiving terminal to monitor communication data in the communication channel. When the at least one second receiving terminal knows after monitoring the data to be synchronized, the data required to be transmitted to the first receiving terminal is transmitted to the communication channel within the second time period. Herein, the data required to be transmitted to the first receiving terminal is used to indicate whether the data to be synchronized acquired by the at least one second receiving terminal is correct. Herein, the at least one second receiving terminal knowing the data to be synchronized may be understood as: the at least one second receiving terminal acquiring the data to be synchronized in the communication channel after monitoring. In implementation, the data to be synchronized may carry a synchronization identifier to enable the first receiving terminal and the at least one second receiving terminal to identify whether the data in the current communication channel is the data to be synchronized.

Specifically, after the at least one second receiving terminal knows after monitoring the data to be synchronized transmitted from the transmitting terminal in the communication channel, i.e., the at least one second receiving terminal acquires the data to be synchronized in the communication channel, then it may be judged whether the acquired data to be synchronized is correct according to a preset verification mechanism. If it is determined that the acquired data to be synchronized is correct, it is determined that the data required to be transmitted to the first receiving terminal is a confirmation message, and the confirmation message is transmitted to the communication channel. In implementation, the confirmation message may be acknowledgement (ACK). When the first receiving terminal receives the ACK transmitted from the at least one second receiving terminal, it may be determined that the at least one second receiving terminal has received the correct data to be synchronized. If the at least one second receiving terminal determines that the acquired data to be synchronized is incorrect, that is, the acquired data to be synchronized is abnormal, it is determined that the data required to be transmitted to the first receiving terminal is a reception error message, and further the reception error message is transmitted to the communication channel. In implementation, the reception error message may be negative acknowledgement (NACK). Therefore, the first receiving terminal may sequentially receive the data to be synchronized transmitted from the transmitting terminal and the data transmitted from the at least one second receiving terminal through the communication channel. It may be appreciated that, in implementation, if a problem occurs in data transmission, the first receiving terminal may not have received the data to be synchronized transmitted from the transmitting terminal and/or the data transmitted from the at least one second receiving terminal.

Step 304: determining that the first receiving terminal and the at least one second receiving terminal complete data synchronization, when a confirmation message transmitted from the first receiving terminal is received.

Herein, the confirmation message is a message transmitted from the first receiving terminal when a preset condition is met. The preset condition is that the first receiving terminal receives preset data from the at least one second receiving terminal and that the first receiving terminal determines that the received data to be synchronized is correct. The preset data is used for indicating that the data to be synchronized known after monitoring by the at least one second receiving terminal is correct. For example, the preset data may be ACK transmitted from the at least one second receiving terminal.

That is, after determining that the first receiving terminal has received the correct data to be synchronized and the at least one second receiving terminal has also received the correct data to be synchronized, the first receiving terminal transmits a confirmation message to the transmitting terminal. After receiving the confirmation message transmitted from the first receiving terminal, the transmitting terminal determines that the first receiving terminal and the at least one second receiving terminal have completed the data synchronization. It may be appreciated that the at least one second receiving terminal may know the confirmation message transmitted from the first receiving terminal in the communication channel between the first receiving terminal and the transmitting terminal, so as to determine that the first receiving terminal has received the correct data to be synchronized. That is, the first receiving terminal and the at least one second receiving terminal may mutually know whether the other party receives the correct data to be synchronized. In one example, when the at least one second receiving terminal knows the confirmation message transmitted from the first receiving terminal, the at least one second receiving terminal may perform an operation instructed by the data to be synchronized. If the at least one second receiving terminal does not know the confirmation message transmitted from the first receiving terminal, the at least one second receiving terminal may not perform any operation.

In implementation, if it is determined that the first receiving terminal and the at least one second receiving terminal have completed data synchronization, the first receiving terminal and the at least one second receiving terminal may perform the operation instructed by the data to be synchronized. For example, the transmitting terminal is an audio source, the first receiving terminal and the at least one second receiving terminal are a first speaker and a second speaker, respectively, and the data to be synchronized is an audio data packet transmitted from the audio source. Then, the first speaker and the second speaker may perform the operation of playing audio according to the received audio data packet. For another example, the transmitting terminal is a mechanical arm controller, the first receiving terminal and the at least one second receiving terminal are a first mechanical arm and a second mechanical arm, respectively. The data to be synchronized is the control information of the mechanical arm transmitted from the mechanical arm controller. The first mechanical arm and the second mechanical arm may perform control operation for the mechanical arm and the mechanical arm respectively, according to the received control information.

Figure 4:
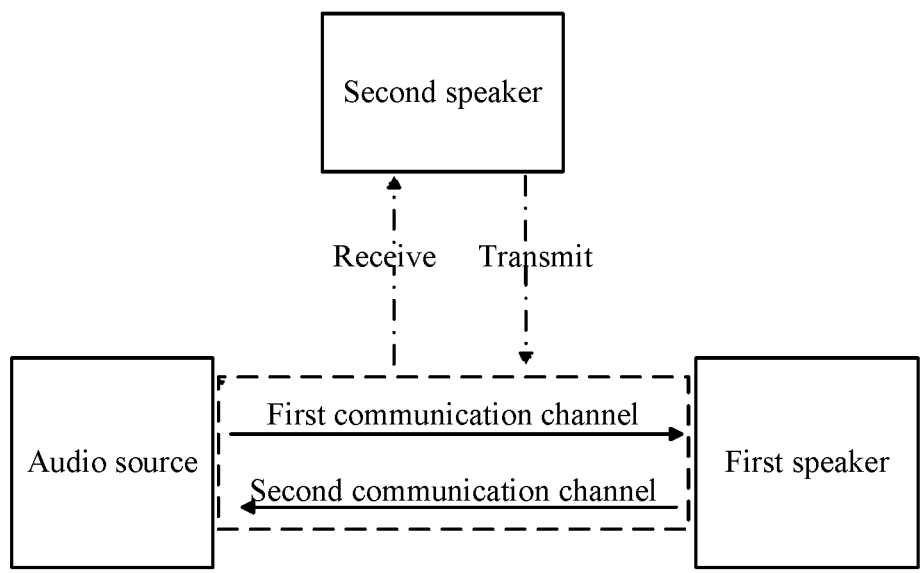
FIG. 4 is a schematic diagram showing communication among a first speaker, a second speaker and an audio source in the second embodiment of the present disclosure.

In order to facilitate understanding this embodiment, the following example is provided for description. With reference to FIG. 4, supposing that the first receiving terminal is the first speaker, the at least one second receiving terminal is the second speaker, and the transmitting terminal is the audio source. The data to be synchronized transmitted by the audio source is an audio data packet.

A wireless communication connection is established between the first speaker and the audio source through a preset communication protocol. Herein, the preset communication protocol may be a standard wireless protocol or a proprietary protocol, or a combination of a standard protocol and a proprietary protocol. There is no need to establish a wireless communication connection between the second speaker and the first speaker, and there is no need to establish a wireless communication connection between the second speaker and the audio source. After the wireless communication connection is established between the first speaker and the audio source, the first speaker may notify the connection information of the connection established between the first speaker and the audio source to the second speaker through directional broadcasting. The connection information may include the information of the communication channel between the first speaker and the audio source, for example, a communication frequency of the communication channel. After receiving the connection information, the second speaker may monitor the communication channel between the first speaker and the audio source, for example, a first communication channel and a second communication channel in FIG. 4, so as to acquire the communication data between the first speaker and the audio source. The second speaker may transmit data to the first communication channel between the first speaker and the audio source without affecting the communication between the first speaker and the audio source. The first speaker may continuously receive data in the communication channel between the first speaker and the audio source within a preset time slice (for example, a time period specified by a standard wireless communication protocol), and in this case, may receive data transmitted from the second speaker.

In implementation, the second speaker may continuously monitor communication data in the first communication channel, and acquire an audio data packet when knowing after monitoring the audio data packet transmitted from the audio source. According to the preset verification mechanism, it is judged whether the acquired audio data packet is a correct audio data packet. If it is a correct audio data packet, a confirmation message is replied in the first communication channel. The first speaker may receive the audio data packet transmitted from the audio source and the confirmation message transmitted from the second speaker through the first communication channel. Then, the first speaker may also determine whether the received audio data packet is a correct audio data packet according to the preset verification mechanism. If it is a correct audio data packet and the first speaker receives the confirmation message transmitted from the second speaker, then the first speaker transmits a confirmation message in the second communication channel, and the second speaker may know the confirmation message transmitted from the first speaker in the second communication channel. In this way, the first speaker and the second speaker complete data synchronization, that is, an audio data packet of the audio source is transmitted to the first speaker and the second speaker at the same time, and the first speaker and the second speaker mutually know that the other party has received the correct audio data packet.

Various conditions may occur to the first speaker and the second speaker during communication, exemplified as follows.

Figure 5:
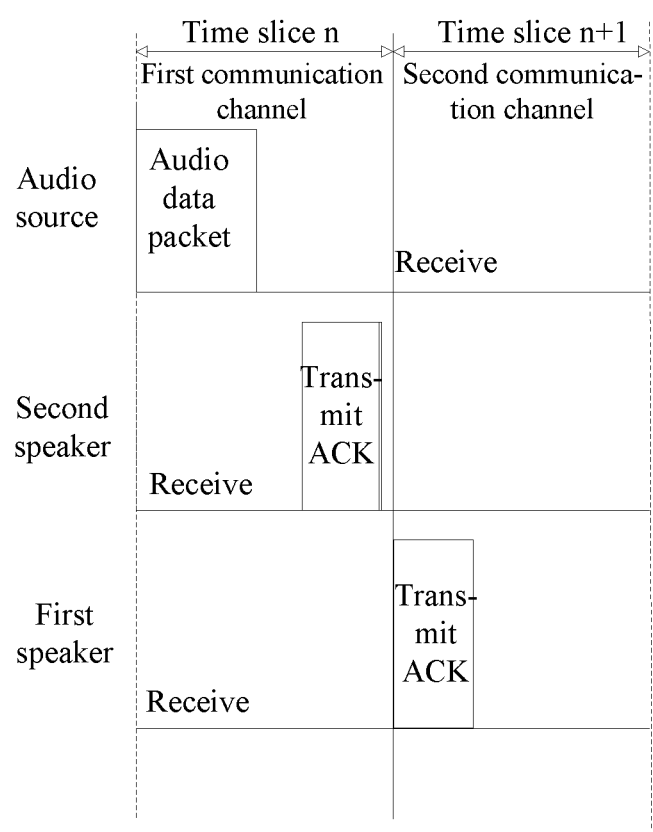
FIG. 5 is a schematic diagram showing a communication process in which both the first speaker and the second speaker receive a correct audio data packet in the second embodiment of the present disclosure.

Scenario 1: FIG. 5 may be referred to for a communication process in which both the first speaker and the second speaker receive a correct audio data packet. The first speaker and the second speaker receive the audio data packet transmitted from the audio source through the first communication channel within a preset time slice n. It is seen from the FIG. 5 that the audio data packet transmitted from the audio source does not occupy the entire time slice n, but a spare time is reserved in the time slice n for the second speaker to transmit data. After completing reception of the audio data packet, the second speaker then transmits a confirmation message ACK to the first communication channel within the reserved spare time. The first speaker receives the audio data packet and the ACK transmitted from the second speaker sequentially. The first speaker replies a confirmation message ACK to the audio source in the second communication channel within a time slice n+1. Herein, the first communication channel and the second communication channel indicate different communication frequencies. In this embodiment, the specific value of the communication frequency is not defined, but may be set according to an actual requirement in implementation. In this case, it may be considered that the first speaker and the second speaker have completed data synchronization. It is may be seen from FIG. 5 that the time period during which the second speaker transmits ACK and the time period during which the second speaker receives the audio data packet do not overlap, but are within the same time slice n. That is, the second speaker may receive the audio data packet in the same time slice and quickly respond based on the received audio data packet.

Figure 6:
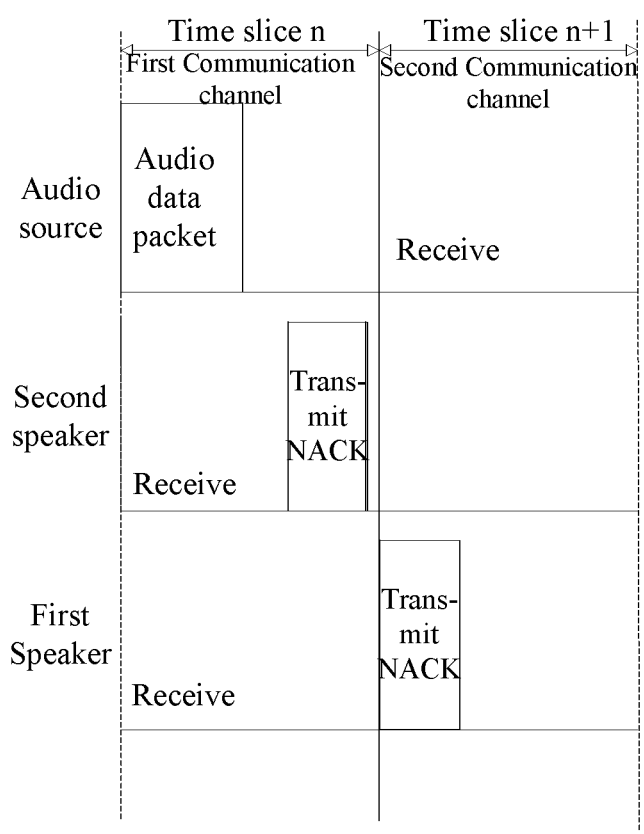
FIG. 6 is a schematic diagram showing a communication process in which the audio data packet received by the second speaker is a wrong one in the second embodiment of the present disclosure.

Scenario 2: FIG. 6 may be referred to for a communication process in which the audio data packet received by the second speaker is a wrong audio data packet. The first speaker and the second speaker receive an audio data packet transmitted from the audio source in the first communication channel within the preset time slice n. After receiving the audio data packet, the second speaker finds that the received audio data packet is wrong, then the second speaker transmits a reception error message NACK in the first communication channel. The first speaker successively receives the audio data packet and the NACK transmitted from the second speaker, and then the first speaker replies to the audio source with a reception error message NACK through the second communication channel in the time slice n+1. After the audio source receives the NACK transmitted from the first speaker, the audio source may resend the original audio data packet, or discard the original audio data packet and then transmit a next audio data packet, according to an actual requirement.

Figure 7:
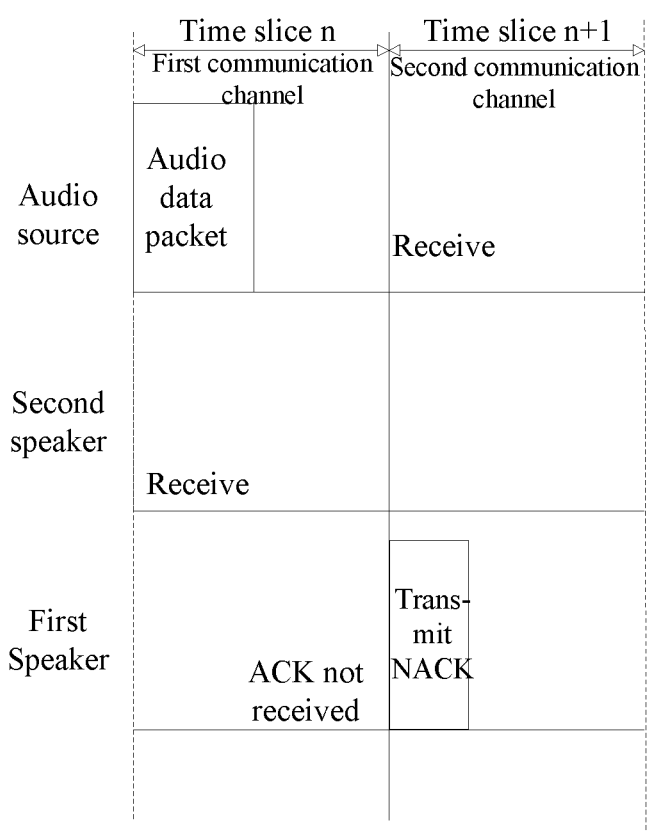
FIG. 7 is a schematic diagram showing a communication process in which the first speaker receives only the audio data packet but does not receive data transmitted from the second speaker in the second embodiment of the present disclosure.

Scenario 3: FIG. 7 may be referred to for a communication process in which the first speaker receives only the audio data packet but does not receive the data transmitted from the second speaker. The first speaker and the second speaker receive the audio data packet transmitted from the audio source through the first communication channel in the preset time slice n. The first speaker only receives the audio data packet but does not receive an ACK transmitted from second speaker in the time slice n, so the first speaker replies to the audio source with a reception error message NACK in the second communication channel in the time slice n+1. After the audio source receives the NACK transmitted from the first speaker, the audio source may resend the original audio data packet, or discard the original audio data packet and then transmit a next audio data packet, according to an actual requirement.

Figure 8:
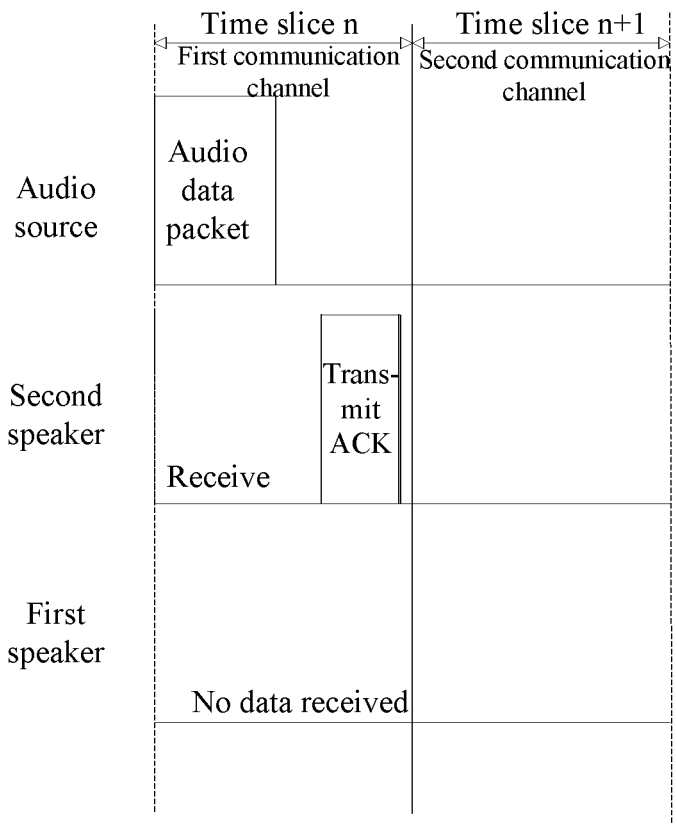
FIG. 8 is a schematic diagram showing a communication process in which the first speaker does not receive any data in the second embodiment of the present disclosure.

Scenario 4: FIG. 8 may be referred to for a communication process in which the first speaker does not receive any data. The audio source transmits an audio data packet through the first communication channel in the preset time slice n, and the second speaker transmits an ACK through the first communication channel after receiving the audio data packet. But the first speaker does not receive any data, and then the first speaker may not make any response.

It shall be noted that the above examples in this embodiment are to facilitate understanding rather than to define the technical solutions of the present disclosure.

Compared with the existing technology, this embodiment is advantageous for performing data synchronization between the first receiving terminal and the at least one second receiving terminal without establishing a wireless connection between the first receiving terminal and the at least one second receiving terminal.

A third embodiment of the present disclosure relates to a data communication method applied to a second receiving terminal. Implementation details of this embodiment are described in the following. The following content is to facilitate understanding the implementation details, but is not indispensable for implementing this solution.

Figure 9:
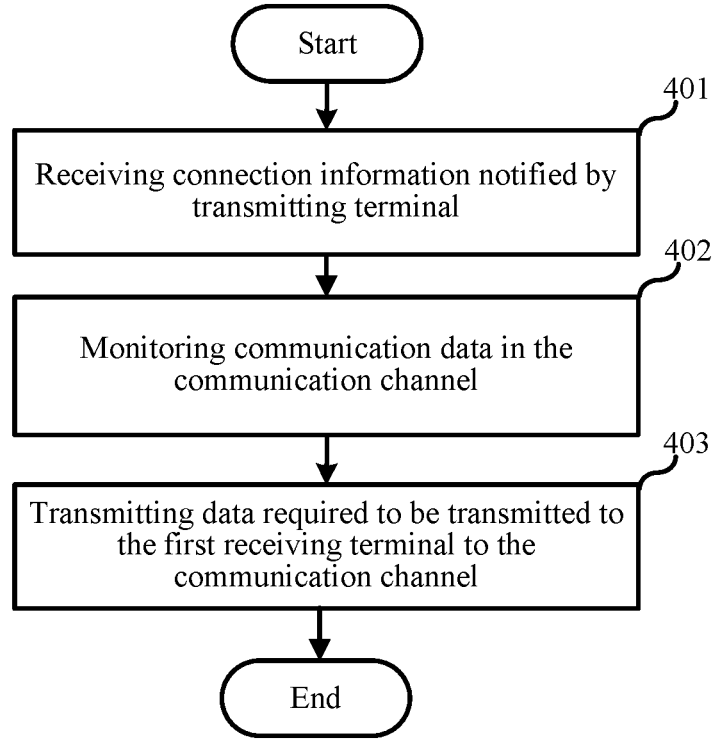
FIG. 9 is a flowchart of a data communication method in a third embodiment of the present disclosure.

FIG. 9 may be referred to for a specific process of the data communication method in this embodiment, including:

Step 401: receiving connection information.

Herein, the connection information is notified to the at least one second receiving terminal after a wireless communication connection is established between a transmitting terminal and a preset first receiving terminal; the connection information includes information of a communication channel for performing wireless communication between the transmitting terminal and the first receiving terminal; and the connection information is used to instruct the at least one second receiving terminal to monitor communication data in the communication channel.

In one example, the communication channel for performing wireless communication between the transmitting terminal and the first receiving terminal includes a first communication channel and a second communication channel. Herein, the first communication channel is a communication channel for the transmitting terminal to transmit data to the first receiving terminal, and the second communication channel is a communication channel for the first receiving terminal to transmit data to the transmitting terminal.

In one example, the information of the communication channel for performing wireless communication between the transmitting terminal and the first receiving terminal includes: a communication frequency of the first communication channel and a communication frequency of the second communication channel.

In one example, the wireless communication connection established between the transmitting terminal and the first receiving terminal is a Bluetooth connection, and the at least one second receiving terminal may receive the connection information through broadcasting.

In one example, the at least one second receiving terminal may receive connection information notified from the transmitting terminal and/or the first receiving terminal. In implementation, that the transmitting terminal notifies the connection information to the at least one second receiving terminal is advantageous for reducing power consumption of the first receiving terminal.

Step 402: monitoring the communication data in the communication channel.

Step 403: transmitting data required to be transmitted to the first receiving terminal to the communication channel.

Herein, a first time period for the transmitting terminal to transmit data in the communication channel does not overlap a second time period for the at least one second receiving terminal to transmit data in the communication channel. The second receiving terminal may transmit the data required to be transmitted to the first receiving terminal to the communication channel if the at least one second receiving terminal knows after monitoring the communication data in the communication channel.

In one example, the first time period and the second time period are acquired through a preset time slice division, and the preset time slice is a time slice predetermined for the first receiving terminal to receive data.

In one example, the wireless communication connection established between the transmitting terminal and the first receiving terminal is a wireless communication connection established based on a preset proprietary protocol; and a duration of the preset time slice is determined according to the number of terminals in the at least one second receiving terminal, and the greater the number of terminals in the at least one second receiving terminal, the longer the second time period by the preset time slice division.

In one example, when the at least one second receiving terminal knows after monitoring that the transmitting terminal transmits data to the first receiving terminal through the communication channel within the first time period, then the data required to be transmitted to the first receiving terminal from the at least one second receiving terminal is transmitted to the communication channel within the second time period. Herein, the data required to be transmitted to the first receiving terminal is used to indicate whether the data transmitted from the transmitting terminal and known after monitoring by the at least one second receiving terminal is correct.

In one example, the data transmitted from the transmitting terminal is data to be synchronized. It is determined that the first receiving terminal and the at least one second receiving terminal complete data synchronization, when the transmitting terminal receives a confirmation message transmitted from the first receiving terminal. Herein, the confirmation message is a message transmitted from the first receiving terminal when a preset condition is met; the preset condition is that the first receiving terminal receives preset data from the at least one second receiving terminal and that the first receiving terminal determines that the data received to be synchronized is correct, the preset data being used for indicating that the data to be synchronized known after monitoring by the at least one second receiving terminal is correct.

In one example, there are N second receiving terminals, N being a natural number greater than 1. Herein, the step of transmitting the data required to be transmitted to the first receiving terminal to the communication channel includes: transmitting the data required to be transmitted to the first receiving terminal to the communication channel in a preset order.

It shall be noted that the data communication method in this embodiment is applied to the at least one second receiving terminal, while the data communication methods in the first and second embodiments are applied to the transmitting terminal. This embodiment may be implemented in coordination with the first and second embodiments. The technical details and technical effects disclosed in the first and second embodiments also work in this embodiment and are not repeated herein. Correspondingly, the technical details in this embodiment also work in the first and second embodiments.

A fourth embodiment of the present disclosure relates to a data communication method applied to a first receiving terminal. Implementation details of this embodiment are described in the following. The following content is to facilitate understanding the implementation details, but is not indispensable for implementing this solution.

Figure 10:
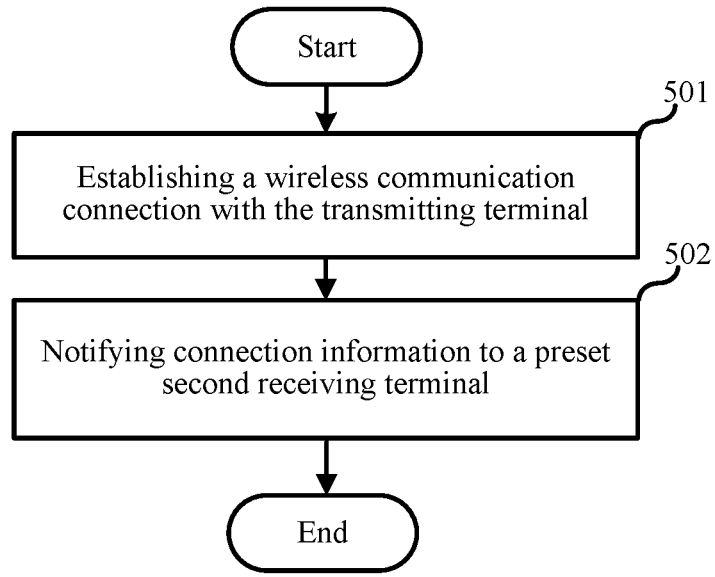
FIG. 10 is a flowchart of a data communication method in a fourth embodiment of the present disclosure.

FIG. 10 may be referred to for a specific process of the data communication method in this embodiment, including:

Step 501: establishing a wireless communication connection with the transmitting terminal.

Step 502: notifying connection information to at least one second receiving terminal.

Herein, the connection information includes information of a communication channel for performing wireless communication between the transmitting terminal and the first receiving terminal. The connection information is used to instruct the at least one second receiving terminal to monitor communication data in the communication channel. When the at least one second receiving terminal knows after monitoring the communication data, the at least one second receiving terminal transmits data required to be transmitted to the first receiving terminal to the communication channel. A first time period for the first receiving terminal to receive data transmitted from the transmitting terminal in the communication channel does not overlap a second time period for receiving data transmitted from the at least one second receiving terminal.

In implementation, since receiving data usually corresponds to transmitting data, the first time period for the first receiving terminal to receive data transmitted from the transmitting terminal in the communication channel may be understood as a first time period for the transmitting terminal to transmit data in the communication channel. The second time period for the first receiving terminal to receive the data transmitted from the at least one second receiving terminal in the communication channel may be understood as a second time period for the at least one second receiving terminal to transmit data in the communication channel.

It may be appreciated that data transmitted from different devices usually have different device identifiers, and there is an ending identifier each time data is transmitted. Therefore, the first receiving terminal may distinguish whether the received data is transmitted from the transmitting terminal or the second receiving device through reference information such as a device identifier and an ending identifier.

In one example, the wireless communication connection is a Bluetooth connection, and the first receiving terminal notifies the connection information to the at least one second receiving terminal through broadcasting.

It shall be noted that the data communication method in this embodiment is applied to the first receiving terminal, the data communication methods in the first and second embodiments are applied to the transmitting terminal, and the data communication method in the third embodiment is applied to the at least one second receiving terminal. This embodiment may be implemented in coordination with the first, second and third embodiments. The technical details and technical effects disclosed in the first, second and third embodiments also work in this embodiment and are not repeated herein. Correspondingly, the technical details in this embodiment also work in the first, second and third embodiments.

The above step division in the above methods is only for clarifying description. In implementation, the steps may be combined into one step or one step may be divided into a plurality of steps, and these steps are included in the protection scope of the present disclosure as long as the same logical relationship are included in the steps. Dispensable amendments or designs added to an algorithm or a process are included in the protection scope of the present disclosure as long as the algorithm and a core design are not changed by the amendments or designs.

Figure 11:
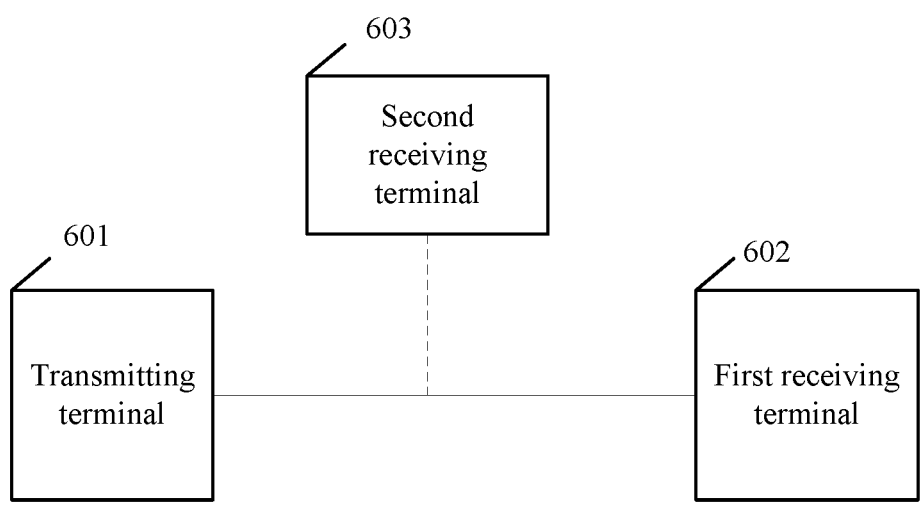
FIG. 11 is a schematic diagram showing a data communication system in a fifth embodiment of the present disclosure.

A fifth embodiment of the present disclosure relates to a data communication system, as shown in FIG. 11, including: a transmitting terminal 601, a first receiving terminal 602 and a second receiving terminal 603. The transmitting terminal 601 is configured to notify connection information to at least one second receiving terminal 603 after establishing a wireless communication connection with a first receiving terminal 602. Herein, the connection information includes information of a communication channel for performing wireless communication between the transmitting terminal 601 and the first receiving terminal 602. The connection information is used to instruct the at least one second receiving terminal 603 to monitor communication data in the communication channel. The second receiving terminal 603 is configured to monitor the communication data in the communication channel, and to transmit data required to be transmitted to the first receiving terminal 602 to the communication channel. Herein, a first time period for the transmitting terminal 601 to transmit data in the communication channel does not overlap a second time period for the at least one second receiving terminal 603 to transmit data in the communication channel. Herein, the solid line in FIG. 11 indicates a wireless communication connection is established between the transmitting terminal 601 and the first receiving terminal 602. The dotted line in FIG. 11 indicates that in a case where no wireless communication connection is established between the at least one second receiving terminal 603 and the transmitting terminal 601, and no wireless communication connection is established between the at least one second receiving terminal 603 and the first receiving terminal 602, the at least one second receiving terminal 603 may monitor the communication channel between the first receiving terminal 602 and the transmitted terminal 601, and transmit data to the communication channel.

It is easy to find that this embodiment is a system embodiment corresponding to the first to fourth embodiments, and this embodiment may be implemented in coordination with the first to fourth embodiments. Related technical details and technical effects in the first to fourth embodiments still work in this embodiment and are not repeated herein. Correspondingly, the related technical details in this embodiment may also be applied to the first to fourth embodiments.

Figure 12:
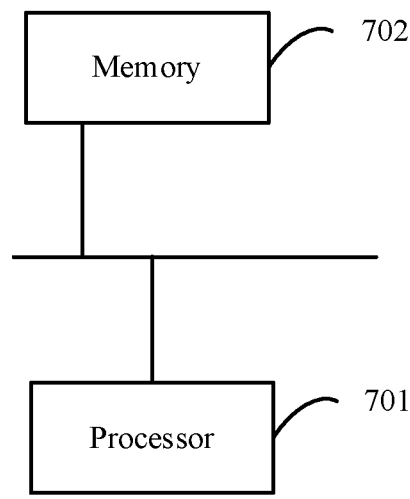
FIG. 12 is a structural schematic diagram showing an electronic device in a sixth embodiment of the present disclosure.

A sixth embodiment of the present disclosure relates to an electronic device, as shown in FIG. 12, including at least one processor 701 and a memory 702 in communication connection with the at least one processor 701. Herein, the memory 702 stores an instruction executable by the at least one processor 701, and the instruction is executable by the at least one processor 701. When the electronic device is a transmitting terminal, the at least one processor may implement the data communication method in the first or second embodiment. When the electronic device is a second receiving terminal, the at least one processor may implement the data communication method according to the third embodiment. When the electronic device is a first receiving terminal, the at least one processor may implement the data communication method according to the fourth embodiment.

Herein, the memory 702 and the processor 701 are connected through a bus. The bus may include any number of interconnected buses and bridges. The bus connects various circuits of one or more processors 701 and memories 702 together. The bus may also connect various other circuits of peripheral devices, voltage regulators, and power management circuits, etc., which are all known in the art. Therefore, no further description is provided on the bus herein. A bus interface provides an interface between the bus and a transceiver. The transceiver may be one element or multiple elements, such as multiple receivers and transmitters, providing a unit for communicating with various other devices on a transmission medium. Data processed by the processor 701 is transmitted on a wireless medium through an antenna, and further, the antenna also receives data and transmits the data to the processor 701.

The processor 701 is responsible for managing the bus and general processing, and may also provide various functions such as timing, a peripheral interface, voltage regulation, power management, and other control functions. The memory 702 may be used to store data used by the processor 701 when performing operations.

Figure 13:
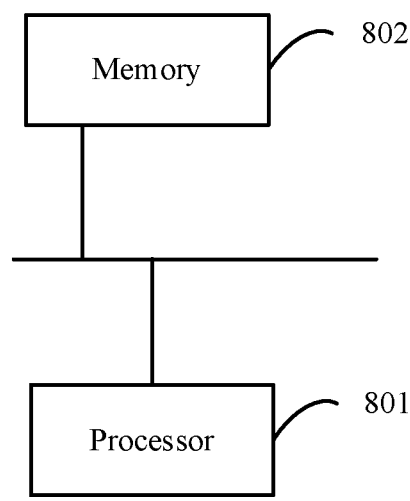
FIG. 13 is a structural schematic diagram showing a chip in a seventh embodiment of the present disclosure.

A seventh embodiment of the present disclosure relates to a chip, as shown in FIG. 13, including at least one processor 801 and a memory 802 in communication connection with the at least one processor 801. Herein, the memory 802 stores an instruction executable by the at least one processor 801, and the instruction is executable by the at least one processor 801, so that the at least one processor 801 may implement the data communication method according to the first or second embodiment, or implement the data communication method according to the third embodiment, or implement the data communication method according to the fourth embodiment.

Herein, the memory 802 and the processor 801 are connected through a bus. The bus may include any number of interconnected buses and bridges. The bus connects various circuits of one or more processors 801 and memories 802 together. The bus may also connect various other circuits of peripheral devices, voltage regulators, and power management circuits, etc., which are all known in the art. Therefore, no further description is provided on the bus herein. A bus interface provides an interface between the bus and a transceiver. The transceiver may be one element or multiple elements, such as multiple receivers and transmitters, providing a unit for communicating with various other devices on a transmission medium. Data processed by the processor 801 is transmitted on a wireless medium through an antenna, and further, the antenna also receives data and transmits the data to the processor 801.

The processor 801 is responsible for managing the bus and general processing, and may also provide various functions such as timing, a peripheral interface, voltage regulation, power management, and other control functions. The memory 802 may be used to store data used by the processor 801 when performing operations.

An eighth embodiment of the present disclosure relates to a computer readable storage medium, storing a computer program. When implemented by a processor, the computer program implements the above method embodiments.

Those skilled in the art may appreciate that all or some steps in the above embodiment methods may be completed through a program instructing related hardware. The program is stored in a storage medium, and includes a number of instructions to enable one device (which may be a single-chip microcomputer or a chip) or processor to implement all or some steps of the method in the embodiments of the present disclosure. The storage medium may be a USB, a mobile hard disc, a read-only memory, a random access memory, a magnetic disc or an optical disc, and the like that may store program codes.

Those skilled in the art may appreciate that the above embodiments are particular embodiments for implementing the present disclosure. In practice, however, the embodiments may be varied in terms of forms and details without departing from the spirit and scope of the present disclosure.

What is claimed is:

1. A data communication method, applied to a transmitting terminal, comprising:
   notifying connection information to at least one second receiving terminal after establishing a wireless communication connection with a first receiving terminal;
   wherein the connection information comprises information of a communication channel for performing wireless communication between the transmitting terminal and the first receiving terminal; the connection information is used to instruct the at least one second receiving terminal to monitor communication data in the communication channel, to enable the at least one second receiving terminal to transmit data required to be transmitted to the first receiving terminal to the communication channel when the communication data is known after monitoring by the at least one second receiving terminal; and
   wherein a first time period for the transmitting terminal to transmit data in the communication channel does not overlap a second time period for the at least one second receiving terminal to transmit data in the communication channel.

2. The data communication method according to claim 1, after the notifying the connection information to the at least one second receiving terminal, further comprising:
   transmitting data to the first receiving terminal through the communication channel in the first time period;
   wherein the connection information is used to instruct the at least one second receiving terminal to monitor data transmitted from the transmitting terminal in the communication channel, to enable the at least one second receiving terminal to transmit data required to be transmitted to the first receiving terminal to the communication channel within the second time period when the data transmitted from the transmitting terminal is known after monitoring by the at least one second receiving terminal; and
   wherein the data required to be transmitted to the first receiving terminal is used to indicate whether the data transmitted from the transmitting terminal and known after monitoring by the second receiving terminal is correct.

3. The data communication method according to claim 2, wherein the data transmitted from the transmitting terminal is data to be synchronized, and the data communication method further comprises:
   determining that the first receiving terminal and the at least one second receiving terminal complete data synchronization, when a confirmation message transmitted from the first receiving terminal is received;
   wherein the confirmation message is a message transmitted from the first receiving terminal when a preset condition is met; the preset condition is that the first receiving terminal receives preset data from the at least one second receiving terminal and that the first receiving terminal determines that the received data to be synchronized is correct, the preset data being used for indicating that the data to be synchronized known after monitoring by the at least one second receiving terminal is correct.

4. The data communication method according to claim 1, wherein the communication channel for performing wireless communication between the transmitting terminal and the first receiving terminal comprises: a first communication channel and a second communication channel;
   wherein the first communication channel is a communication channel for the transmitting terminal to transmit data to the first receiving terminal, and the second communication channel is a communication channel for the first receiving terminal to transmit data to the transmitting terminal.
   wherein information of the communication channel for performing wireless communication between the transmitting terminal and the first receiving terminal comprises: a communication frequency of the first communication channel and a communication frequency of the second communication channel.

5. The data communication method according to claim 1, wherein the first time period and the second time period are acquired through a preset time slice division, and the preset time slice is a time slice predetermined for the first receiving terminal to receive data; the preset time slice is determined according to a communication protocol that the transmitting terminal and the first receiving terminal are based on when establishing the wireless communication connection.

6. The data communication method according to claim 5, wherein the wireless communication connection established between the transmitting terminal and the first receiving terminal is a wireless communication connection established based on a preset proprietary protocol;
   a duration of the preset time slice is determined according to the number of terminals in the at least one second receiving terminal, and the greater the number of terminals in the at least one second receiving terminal, the longer the second time period obtained through the preset time slice division.

7. The data communication method according to claim 1, wherein there are N receiving terminals in the at least one second receiving terminal, N being a natural number greater than 1;
   wherein the connection information is used to instruct the N second receiving terminals to monitor communication data in the communication channel, and to enable the N second receiving terminals to transmit data required to be transmitted to the first receiving terminal to the communication channel in a preset order.

8. The data communication method according to claim 1, wherein the wireless communication connection is a Bluetooth connection; and the notifying the connection information to the at least one second receiving terminal comprises:
   notifying the connection information to the at least one second receiving terminal through broadcasting.

9. The data communication method according to claim 1, wherein the transmitting terminal and the at least one second receiving terminal are configured to transmit data to the first receiving terminal through a same communication channel.

10. A data communication method, applied to a first receiving terminal, comprising:
   notifying connection information to at least one second receiving terminal after establishing a wireless communication connection with a transmitting terminal;
   wherein the connection information comprises information of a communication channel for performing wireless communication between the transmitting terminal and the first receiving terminal; the connection information is used to instruct the at least one second receiving terminal to monitor communication data in the communication channel, to enable the second receiving terminal to transmit data required to be transmitted to the first receiving terminal to the communication channel when the communication data is known after monitoring by the at least one second receiving terminal; and
   wherein a first time period for the first receiving terminal to receive data transmitted from the transmitting terminal does not overlap a second time period for receiving data transmitted from the at least one second receiving terminal in the communication channel.

11. The data communication method according to claim 10, wherein the wireless communication connection is a Bluetooth connection; and the notifying the connection information to the at least one second receiving terminal comprises:
   notifying the connection information to the at least one second receiving terminal through broadcasting.

12. The data communication method according to claim 10, wherein the first receiving terminal receives data from the transmitting terminal and the at least one second receiving terminal through a same communication channel;
   wherein the data required to be transmitted to the first receiving terminal is used to indicate whether the data transmitted from the transmitting terminal and known after monitoring by the second receiving terminal is correct.

13. A data communication method, applied to a second receiving terminal, comprising:
   receiving connection information; wherein the connection information is notified after a transmitting terminal and a first receiving terminal establish a wireless communication connection; the connection information comprises information of a communication channel for performing wireless communication between the transmitting terminal and the first receiving terminal; and the connection information is used to instruct the at least one second receiving terminal to monitor communication data in the communication channel;
   monitoring the communication data in the communication channel; and
   transmitting data required to be transmitted to the first receiving terminal to the communication channel; wherein a first time period for the transmitting terminal to transmit data in the communication channel does not overlap a second time period for the at least one second receiving terminal to transmit data in the communication channel.

14. The data communication method according to claim 13, wherein the transmitting data required to be transmitted to the first receiving terminal to the communication channel comprises:
   transmitting the data required to be transmitted to the first receiving terminal to the communication channel during the second time period, when data transmitted from the transmitting terminal to the first receiving terminal through the communication channel during the first time period is known after monitoring;
   wherein the data required to be transmitted to the first receiving terminal is used to indicate whether the data transmitted from the transmitting terminal and known after monitoring by the at least one second receiving terminal is correct.

15. The data communication method according to claim 14, wherein the data transmitted from the transmitting terminal is data to be synchronized, and the data communication method further comprises:
   determining that the first receiving terminal and the at least one second receiving terminal complete data synchronization, when a confirmation message transmitted from the first receiving terminal is received by the transmitting terminal;
   wherein the confirmation message is a message transmitted from the first receiving terminal when a preset condition is met; the preset condition is that preset data is received by the first receiving terminal from the at least one second receiving terminal and that the received data to be synchronized is determined by the first receiving terminal to be correct, the preset data being used for indicating that the data to be synchronized known after monitoring by the at least one second receiving terminal is correct.

16. The data communication method according to claim 13, wherein the first time period and the second time period are acquired through a preset time slice division, and the preset time slice is a time slice predetermined for the first receiving terminal to receive data.

17. The data communication method according to claim 16, wherein the wireless communication connection established between the transmitting terminal and the first receiving terminal is a wireless communication connection established based on a preset proprietary protocol; and a duration of the preset time slice is determined according to the number of terminals in the at least one second receiving terminal, and the greater the number of terminals in the at least one second receiving terminal, the longer the second time period obtained through the preset time slice division.

18. The data communication method according to claim 13, wherein there are N receiving terminals in the at least one second receiving terminal, N being a natural number greater than 1;

wherein the transmitting the data required to be transmitted to the first receiving terminal to the communication channel comprises:

transmitting the data required to be transmitted to the first receiving terminal to the communication channel in a preset order.

19. The data communication method according to claim 13, wherein the wireless communication connection is a Bluetooth connection, and the receiving the connection information comprises:

receiving the connection information through broadcasting.

20. The data communication method according to claim 13, wherein the receiving the connection information comprises:

receiving the connection information notified from the transmitting terminal and/or the first receiving terminal.

* * * * *